United States Patent
Je et al.

(10) Patent No.: US 10,291,170 B2
(45) Date of Patent: May 14, 2019

(54) MOTOR DRIVING DEVICE AND LAUNDRY TREATMENT APPARATUS INCLUDING THE SAME

(71) Applicant: LG ELECTRONICS INC., Seoul (KR)

(72) Inventors: Jungmoon Je, Seoul (KR); Minho Jang, Seoul (KR); Hyunjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 15/017,337

(22) Filed: Feb. 5, 2016

(65) Prior Publication Data
US 2016/0233816 A1 Aug. 11, 2016

(30) Foreign Application Priority Data
Feb. 10, 2015 (KR) .......................... 10-2015-0020414

(51) Int. Cl.
*H02P 29/024* (2016.01)
*D06F 37/30* (2006.01)
(Continued)

(52) U.S. Cl.
CPC ........ *H02P 29/0241* (2016.02); *D06F 37/304* (2013.01); *H02P 6/08* (2013.01);
(Continued)

(58) Field of Classification Search
CPC .... D06F 37/304; D06F 37/306; H02P 29/024; H02P 29/0241; H02P 6/08; H02P 6/28; H02P 21/28; H02P 27/06
See application file for complete search history.

(56) References Cited

U.S. PATENT DOCUMENTS

2002/0116961 A1* 8/2002 Kim ..................... D06F 37/304
68/23.7
2013/0271048 A1 10/2013 Iwashita et al.

FOREIGN PATENT DOCUMENTS

JP   2006-191721 A   7/2006
JP   2007-221864     8/2007
(Continued)

OTHER PUBLICATIONS

Machine Translation of Nakajima, JP 2006-191721, Jul. 2006. (Year: 2006).*

(Continued)

*Primary Examiner* — David G Cormier
(74) *Attorney, Agent, or Firm* — KED & Associates LLP

(57) ABSTRACT

The present disclosure relates to a motor driving device and a laundry treatment apparatus. An inverter is configured to convert a DC voltage of DC terminals into an AC voltage according to a switching operation and to output the AC voltage to a motor. A DC terminal voltage detector is configured to detect the voltage of the DC terminals, and an output current detector is configured to detect an output current flowing through the motor. A controller is configured to control the inverter based on the detected output current. The controller controls the motor to operate based on a flux current command value from among the flux current command values and a torque current command value for driving the motor in an overvoltage protection mode when the detected DC terminal voltage is higher than a first predetermined value and power is supplied from the motor to the DC terminals. Abrupt DC terminal voltage increase may be prevented.

19 Claims, 14 Drawing Sheets

(51) Int. Cl.
*H02P 27/06* (2006.01)
*H02P 6/28* (2016.01)
*H02P 6/08* (2016.01)
*H02P 21/28* (2016.01)

(52) U.S. Cl.
CPC ............... *H02P 6/28* (2016.02); *H02P 21/28* (2016.02); *H02P 27/06* (2013.01)

(56) References Cited

FOREIGN PATENT DOCUMENTS

| | | |
|---|---|---|
| JP | 2010-011687 | 1/2010 |
| KR | 10-2006-0009198 A | 1/2006 |
| KR | 10-2010-0105197 A | 9/2010 |
| KR | 10-2014-0045714 A | 4/2014 |

OTHER PUBLICATIONS

European Search Report dated Jul. 8, 2016 issued in Application No. 16154422.6.

\* cited by examiner

MOTOR DRIVING DEVICE AND LAUNDRY TREATMENT APPARATUS INCLUDING THE SAME

CROSS-REFERENCE TO RELATED APPLICATION

This application claims the priority benefit of Korean Patent Application No. 10-2015-0020414, filed on Feb. 10, 2015 in the Korean Intellectual Property Office, the disclosure of which is incorporated herein by reference.

BACKGROUND

1. Field

The present disclosure relates to a motor driving device and a laundry treatment apparatus including the same and, more specifically, to a motor driving device or apparatus preventing a DC terminal voltage from increasing abruptly and a laundry treatment apparatus including the same.

2. Background

A laundry treatment apparatus washes laundry using friction between a washing tub rotating by a motor driving force applied thereto and the laundry in a state in which the laundry, detergent and water are contained in the washing tub. The laundry treatment apparatus can wash laundry without damaging and tangling the laundry.

A laundry treatment apparatus includes a position sensor for sensing the position of a rotor of a motor. However, a laundry treatment apparatus without a position sensor is under development for manufacturing cost reduction, and a method for correctly estimating the position of the rotor of the motor without the position sensor is discussed.

BRIEF DESCRIPTION OF THE DRAWINGS

The embodiments will be described in detail with reference to the following drawings in which like reference numerals refer to like elements wherein.

DETAILED DESCRIPTION

Figure 1:
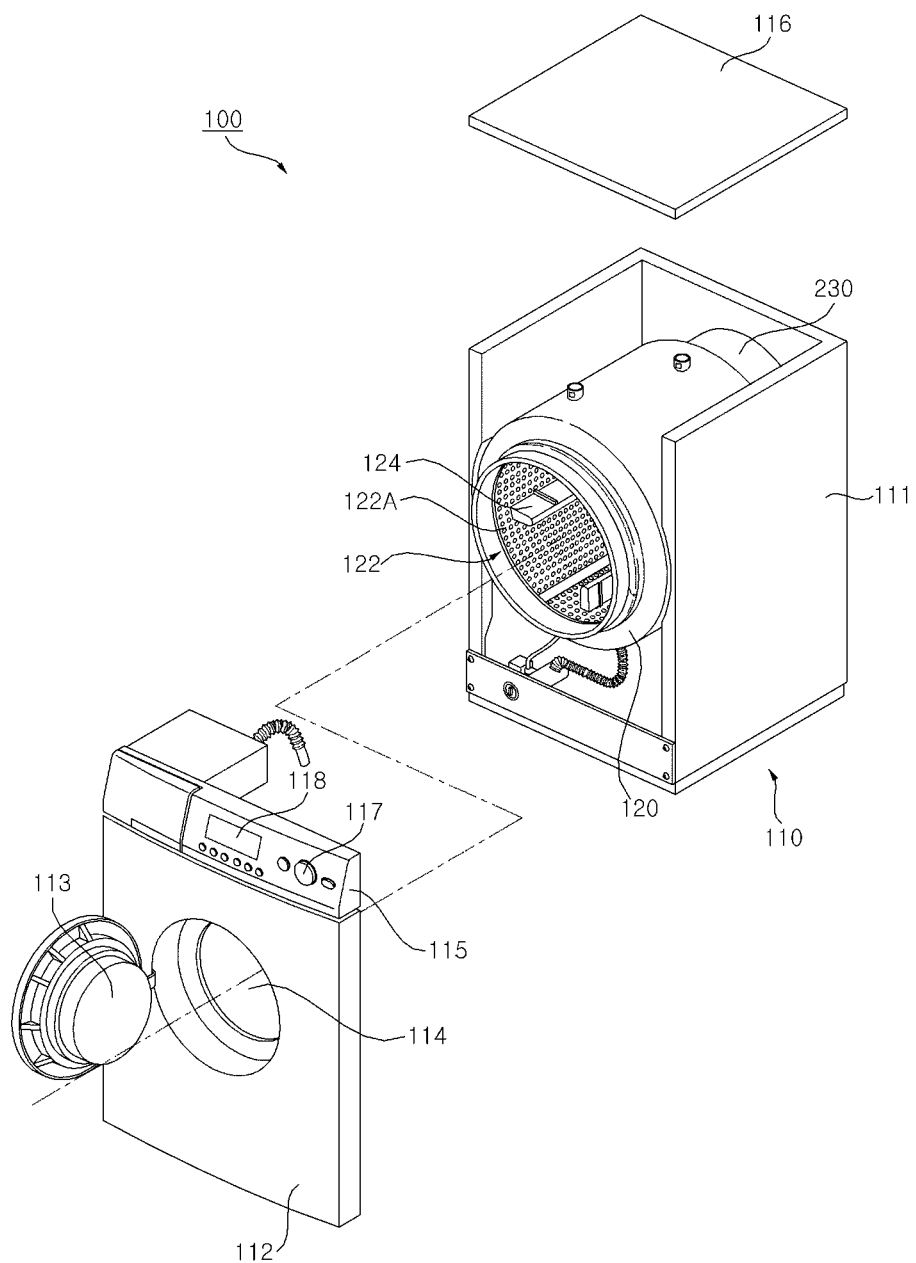
FIG. 1 is a perspective view of a laundry treatment apparatus according to an embodiment of the present disclosure.

A laundry treatment apparatus described in the specification may be a sensorless type laundry treatment apparatus which estimates the position of a rotor without using a position sensor for sensing the position of the rotor of the motor configured to rotate a washing tub. FIG. 1 is a perspective view of the laundry treatment apparatus according to an embodiment of the present disclosure.

The laundry treatment apparatus 100 may be a front load type laundry treatment apparatus where clothing is loaded into a washing tub through the front thereof. A combo front load type laundry treatment apparatus may be a washing apparatus that washes, rinses and spin-dries clothing loaded therein and a drying apparatus that dries wet clothing loaded therein.

In the laundry treatment apparatus 100, a cabinet 110 forms the exterior of the laundry treatment apparatus 100, and a tub 120 is located inside the cabinet 110 and supported by the cabinet 110. A washing tub 122 is provided to the inside of the tub 120, in which clothing is washed, and a motor 230 drives the washing tub 122. A washing water supply unit may be provided outside a cabinet body 111 and supplies washing water to the inside of the cabinet 110. A drainage unit may be provided under the tub 120 and discharges washing water to the outside.

The washing tub 122 has a plurality of through-holes 122A through which washing water passes. A lifter 124 may be provided to the inner side of the washing tub 122 such that laundry is lifted to a predetermined height when the washing tub 1223 rotates and then dropped according to gravity.

The cabinet 110 includes the cabinet body 111, a cabinet cover 112 provided to the front of the cabinet body 111 and combined with the cabinet body 111. A control panel 115 may be provided to the upper side of the cabinet cover 112 and combined with the cabinet body 111. A top plate 116 may be provided to the top of the control panel 115 and combined with the cabinet body 111.

The cabinet cover 112 includes a clothing entrance hole 114 through which clothing is loaded/unloaded into/from the washing tub 122. A door 113 may be provided to be rotatable to the left and right such that the clothing entrance hole 114 can be open and closed.

The control panel 115 may include operation keys 117 for controlling an operation state of the laundry treatment apparatus 100 and a display 118 may be provided to one side of the operation keys 117 and may display an operation state of the laundry treatment apparatus 100. The operation keys 117 and the display 118 included in the control panel 115 are electrically connected to a controller and the controller electrically controls components of the laundry treatment apparatus 100.

The washing tub 122 may include an auto-balance. The auto-balance reduces vibration generated according to eccentricity of laundry in the washing tub 122 and may be implemented by a liquid balance, a ball balance and the like. The laundry treatment apparatus 100 may further include a vibration sensor for measuring vibration of the washing tub 122 or the cabinet 110.

Figure 2:
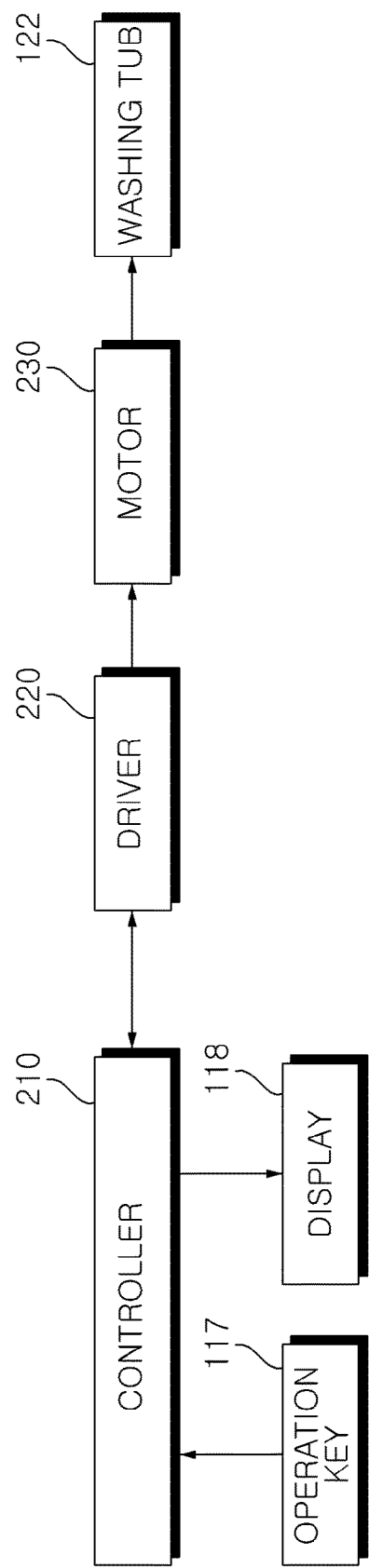
FIG. 2 is a block diagram of the laundry treatment apparatus of FIG. 1.

In the laundry treatment apparatus 100 of FIG. 2, a driver 220 is controlled by a controller 210 and drives the motor 230 to rotate the washing tub 122. The controller 210 operates by receiving an operation signal from the operation keys 117 to perform at least one of, washing, rinsing or spin dry cycles. The controller 210 may also control the display 118 to display a washing course, washing time, spin-drying time, rinsing time and the like or a current operation state. The controller 210 controls the driver 220 to operate the motor 230. The motor 230 does not include a position sensor for sensing a rotor position of the motor, i.e., the driver 220 controls the motor 230 sensorlessly.

The driver 220 drives the motor 230 and may include an inverter, an inverter controller, an output current detector (E of FIG. 3) for detecting output current flowing through the motor 230, and an output voltage detector (F of FIG. 3) for detecting an output voltage $v_o$ applied to the motor 230. In addition, the driver 220 may further include a converter for supplying a DC voltage input to the inverter.

For example, the inverter controller (430 of FIG. 3) included in the driver 220 estimates the rotor position of the motor 230 on the basis of output current $i_o$ and output voltage $v_o$ and controls the motor 230 to rotate on the basis of the estimated rotor position. For example, when the inverter controller (430 of FIG. 3) generates a pulse width modulation (PWM) switching control signal (Sic of FIG. 3) on the basis of the output current $i_o$ and output voltage $v_o$ and outputs the switching control signal to the inverter, the inverter supplies an AC voltage having a predetermined frequency to the motor 230 by performing fast switching operation. Then, the motor 230 rotates by the AC voltage at the predetermined frequency.

The controller 210 may sense the quantity of clothing on the basis of the output current $i_o$ flowing through the motor 230. For example, the controller 210 may sense the quantity of clothing on the basis of the current value $i_o$ of the motor 230 while the washing tub 122 rotates. The controller 210 may sense eccentricity of the washing tub 122, e.g., unbalance (UB) of the washing tub 122. The controller 210 may sense eccentricity on the basis of a ripple component of the output current $i_o$ flowing through the motor 230 or a rotating speed variation of the washing tub 122.

Figure 3:
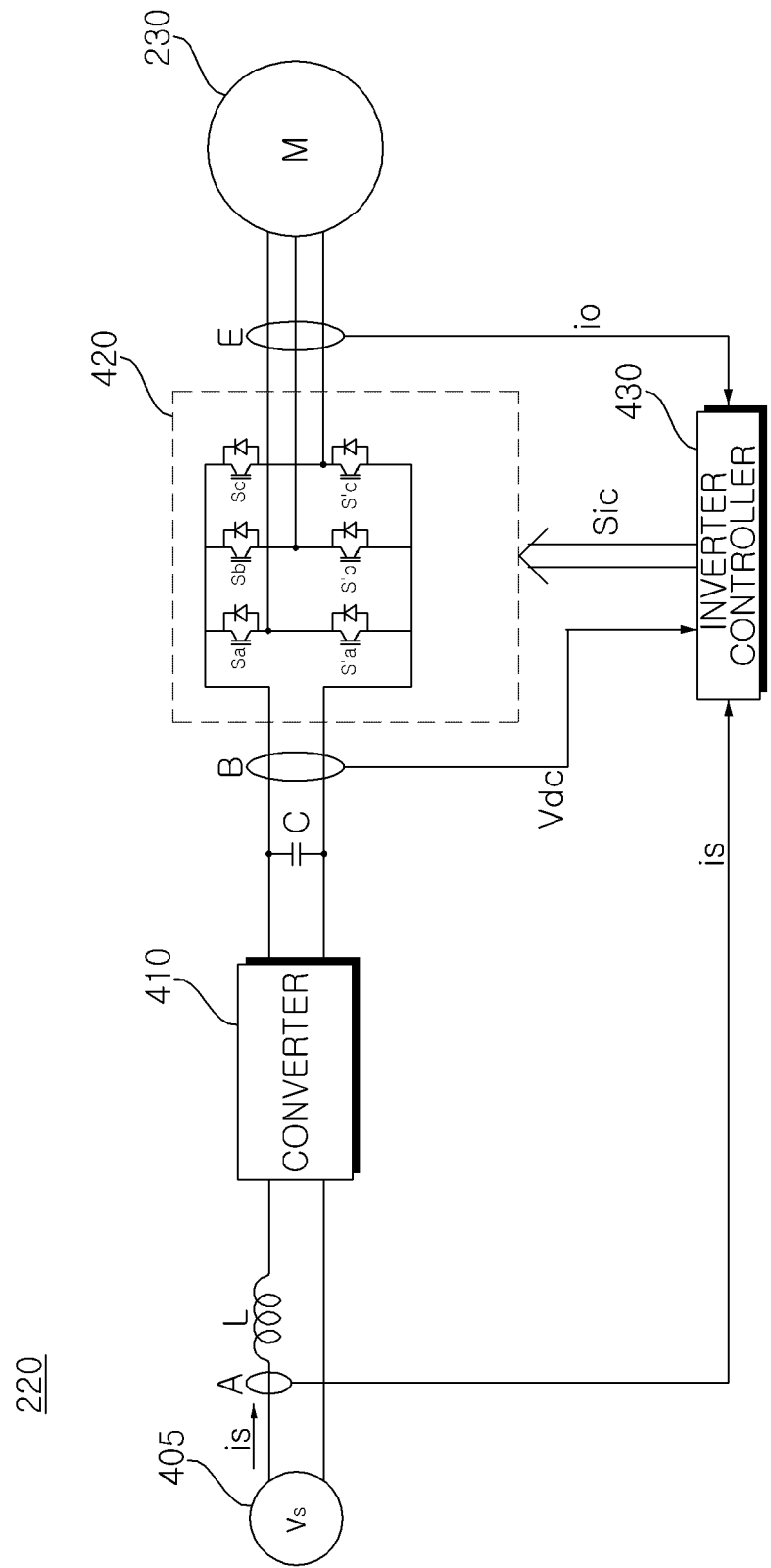
FIG. 3 is a circuit diagram of a driver shown in FIG. 2.

FIG. 3 is a circuit diagram of the driver shown in FIG. 2. A motor driver 220 may correspond to the driver 220 shown in FIG. 2. The motor driver 220 may be referred to as a motor driving device or component. The driver 220 drives the motor sensorlessly and includes a converter 410, an inverter 420, the inverter controller 430, a DC terminal voltage detector B, a smoothing capacitor C, and the output current detector E. The driver 220 may further include an input current detector A and a reactor L (or inductor).

The reactor L is provided between a commercial AC power supply 405 and the converter 410 and performs power factor correction and voltage boosting. In addition, the reactor L may execute a function of limiting harmonic current according to fast switching of the converter 401. The input current detector A may detect input current $i_s$ supplied from the commercial AC power supply 405. For example, a current transformer (CT), shunt resistor and the like may be used as the input current detector A. The detected input current $i_s$ a discrete signal in a pulse form and may be applied to the inverter controller 430.

The converter 410 converts a commercial AC voltage that is supplied from the commercial AC power supply 405 and passes through the reactor L into a DC voltage. While the commercial AC power supply 405 is shown as a single-phase AC power supply in the figure, the commercial AC power supply may be a three-phase AC power supply. The internal configuration of the converter 410 depends on the type of the commercial AC power supply 405. The converter 410 may be configured in the form of a diode without a switching element so as to perform a rectification operation without a switching operation.

For example, four diodes in a bridge form may be used for the single-phase AC power supply and six diodes in a bridge form can be used for the three-phase AC power supply. In an alternative example, a half bridge type converter, having two switching elements and four diodes may be used as the converter 410. In the case of the three-phase AC power supply, six switching elements and six diodes may be used. When the converter 410 includes switching elements, voltage boosting operation, power factor improvement and DC voltage conversion can be performed according to switching operations of the switching elements.

The smoothing capacitor C smoothes and stores the voltage input thereto. While one element is shown as the smoothing capacitor C in the figure, a plurality of elements may be provided to secure element stability. The smoothing capacitor C may be connected to the output terminal of the converter 410. However, the present disclosure is not limited thereto and a DC voltage may be directly input to the smoothing capacitor C. For example, a DC voltage from a solar cell can be directly input to the smoothing capacitor C or converted into a DC voltage and applied to the smoothing capacitor C. The following description is based on the part illustrated in the figure.

Because the DC voltage is applied across both terminals of the smoothing capacitor C, the terminals may be referred to as DC terminals or DC link terminals. The DC terminal voltage detector B may detect a DC terminal voltage Vdc applied across both terminals of the smoothing capacitor C. The DC terminal voltage detector B may include a resistor, an amplifier and the like. The detected DC terminal voltage Vdc is a discrete signal in a pulse form and may be applied to the inverter controller 430.

The inverter 420 may include a plurality of inverter switching elements, convert a DC voltage Vdc smoothed by on/off operations of the switching elements into three-phase AC voltages Va, Vb and Vc at predetermined frequencies and output the three-phase AC voltages to a three-phase synchronous motor 230.

The inverter 420 is constructed in such a manner that serially connected upper switching elements Sa, Sb and Sc and serially connected lower switching elements S'a, S'b and S'c are respectively paired such that three pairs of switching elements Sa&S'a, Sb&S'b and Sc&S'c are connected in parallel. Diodes are connected in reverse parallel with the switching elements Sa, S'a, Sb, S'b, Sc and S'c. The switching elements included in the inverter 420 are switched on/off based on an inverter switching control signal Sic from the inverter controller 430. Accordingly, the three-phase AC voltages having predetermined frequencies are output to the three-phase synchronous motor 230.

The inverter controller 430 may control switching operation of the inverter 420 sensorlessly. To this end, the inverter controller 430 may receive an output current $i_o$ detected by the output current detector E. The inverter controller 430 outputs the inverter switching control signal Sic to the inverter 420 in order to control switching operation of the inverter 420. The inverter switching control signal Sic is a pulse width modulation (PWM) switching control signal and is generated on the basis of the output current $i_o$ detected by the output current detector E.

The output current detector E detects the output current $i_o$ flowing between the inverter 420 and the three-phase synchronous motor 230. The output current detector E detects current flowing through the motor 230. The output current detector E may detect output currents ia, ib and ic of three phases or detect output currents of two phases using three phase equilibrium.

The output current detector E may be provided between the inverter 420 and the motor 230, and a current transformer (CT), a shunt resistor and the like may be used as the output current detector E for current detection. When the shunt resistor is used, three shunt resistors may be provided between the inverter 420 and the synchronous motor 230 or one terminal of each shunt resistor may be connected to each of the three lower switching elements S'a, S'b and S'c of the inverter 420. Two shunt resistors may be employed using three phase equilibrium. When one shunt resistor is used, the shunt resistor may be provided between the capacitor C and the inverter 420.

The detected output current $i_o$ is a discrete signal in a pulse form and may be applied to the inverter controller 430. The inverter switching control signal Sic is generated on the basis of the detected output current $i_o$. The output currents ia, ib and ic of three phases are collectively referred to as the detected output current $i_o$.

The three-phase motor 230 includes a stator and a rotor. An AC voltage of each phase at a predetermined frequency is applied to a coil of the stator of each phase a, b or c such that the rotor rotates. For example, the motor 230 can include a surface-mounted permanent-magnet synchronous motor (SMPMSM), an interior permanent magnet synchronous motor (IPMSM), a synchronous reluctance motor (Synrm) and the like. The SMPMSM and IPMSM are permanent magnet synchronous motors (PMSMs) employing a permanent magnet and the Synrm has no permanent magnet.

Figure 4:
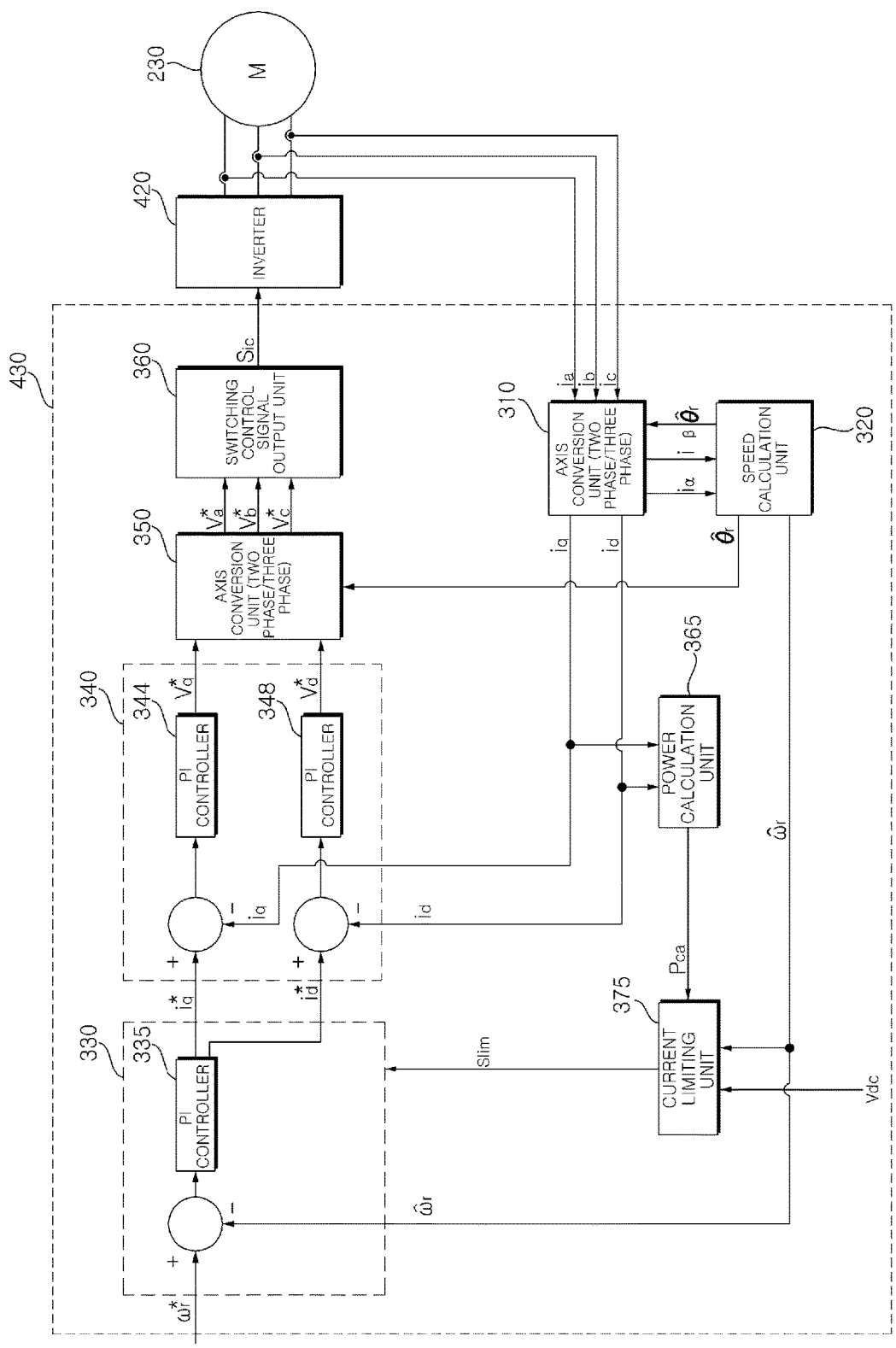
FIG. 4 is a block diagram of an inverter controller shown in FIG. 3.

FIG. 4 is a block diagram of the inverter controller of FIG. 3. The inverter controller 430 may include an axis transformation unit or module 310, a speed calculation unit or module 320, a current command generator 330, a voltage command generator 340, an axis transformation unit 350, a switching control signal output unit 360, a power calculation unit or module 365 and a current limiter or limiting unit 375.

The axis transformation unit 310 receives the output currents ia, ib and ic of three phases, detected by the output current detector E and converts the output currents ia, ib and ic of three phases into two-phase currents iα and iβ in a rest frame. The axis transformation unit 310 may convert the two-phase currents iα and iβ in the rest frame into two-phase currents id and ig in a rotating reference frame.

The speed calculation unit 320 may output a calculated position $\hat{\theta}_r$ and a calculated speed $\hat{\omega}_r$ on the basis of the two-phase currents iα and iβ in the rest frame, converted by the axis transformation unit 310.

The current command generator 330 generates a current command value i*q on the basis of the calculated speed $\hat{\omega}_r$ and a speed command value ω*r. For example, the current command generator 330 can perform PI control in a PI controller 335 on the basis of a difference between the calculated speed $\hat{\omega}_r$ and the speed command value ω*r to generate the current command value i*q. While the q-axis current command value i*q is exemplified as the current command value in FIG. 4, a d-axis current command value i*d may be generated along with the q-axis current command value i*q. The d-axis current command value i*d may be set to 0. The current command generator 330 may further include a limiter that limits the level of the current command value i*q such that the level does not exceed an allowable range.

The voltage command generator 340 generates d-axis and q-axis voltage command values v*d and v*q on the basis of the d-axis and q-axis currents id and iq, which are transformed into the two-phase rotating reference frame by the axis transformation unit, and the current command values i*d and i*q generated by the current command generator 330. For example, the voltage command generator 340 can perform PI control in a PI controller 344 on the basis of a difference between the q-axis current iq and the q-axis current command value i*q and generate the q-axis voltage command value v*q. In addition, the voltage command generator 340 may perform PI control in a PI controller 348 on the basis of a difference between the d-axis current id and the d-axis current command value i*d and generate the d-axis voltage command value v*d. The voltage command generator 340 may further include a limiter that limits the levels of the d-axis and a-axis voltage command values v*d and v*q such that the levels do not exceed allowable ranges.

The generated d-axis and q-axis voltage command values v*d and v*q are applied to the axis transformation unit 350. The axis transformation unit 350 receives the position $\hat{\theta}_r$ calculated in the speed calculation unit 320 and the d-axis and q-axis voltage command values v*d and v*q and performs axis transformation.

The axis transformation unit 350 transforms the two-phase rotating reference frame into a two-phase rest frame. The position $\hat{\theta}_r$ calculated in the speed calculation unit 320 may be used. In addition, the axis transformation unit 350 transforms the two-phase rest frame into a three-phase rest frame. The axis transformation unit 350 outputs three-phase output voltage command values v*a, v*b and v*c through such transformation.

The switching control signal output unit 360 generates the PWM inverter switching control signal Sic on the basis of the three-phase output voltage command values v*a, v*b and v*c. The inverter switching control signal Sic output from the switching control signal output unit 360 can be converted into a gate driving signal in a gate driver and applied to a gate of each switching element included in the inverter 420. Accordingly, the switching elements Sa, S'a, Sb, S'b, Sc and S'c in the inverter 420 perform switching operations.

The power calculation unit 365 calculates power Pca consumed in the motor 230 on the basis of the detected output current $i_o$. For example, the power calculation unit 365 may calculate the power Pca consumed in the motor 230 on the basis of the detected output current $i_o$ and an applied output voltage. To this end, an output voltage detector for detecting the output voltage $v_o$ applied to the motor 230 may be further provided. The power calculation unit 365 may calculate the power Pca consumed in the motor 230 on the basis of a phase difference between the output current $i_o$ and the output voltage $v_o$ and the output current $i_o$.

The current limiting unit 375 may receive the DC terminal voltage Vdc detected by the DC terminal voltage detector B, the power Pca from the power calculation unit 365 and the speed $\hat{\omega}_r$ calculated in the speed calculation unit 320. The current limiting unit 375 included in the inverter controller 430 may limit a current command value for driving the motor 230 in an overvoltage protection mode when the detected DC terminal voltage Vdc is higher than a first predetermined value and power is supplied from the motor 230 to the DC terminals.

The current limiting unit 375 included in the inverter controller 430 may determine that power is supplied from the motor 230 to the DC terminals when the power Pca calculated in the power calculation unit 365 has a negative value.

The current limiting unit 375 in the inverter controller 430 may respectively limit a flux current command value $i^*_d$ and a torque current command value $i^*_q$ for driving the motor 230 to predetermined levels. For example, the current limiting unit 375 can output limitation information $S_{lim}$ for limiting current command values to the current command generator 330 in the overvoltage protection mode. Accordingly, the current command generator 220 may output only the flux current command value $i^*_d$ from among the flux current command value $i^*_d$ and the torque current command value $i^*_q$ for driving the motor 230 on the basis of the limitation information $S_{lim}$ for limiting current command values in the overvoltage protection mode.

The current limiting unit 375 in the inverter controller 430 may control the motor 230 to operate on the basis of the flux current command value $i^*_d$ from among the flux current command value $i^*_d$ and the torque current command value $i^*_q$ for driving the motor 230 in the overvoltage protection mode. For example, the current limiting unit 375 may output only the flux current command value $i^*_d$ to the current command generator 330 in order to drive the motor 230 in the overvoltage protection mode. Accordingly, the current command generator 330 may bypass and output the flux current command value $i^*_d$ input from the current limiting unit 375 instead of generating a current command value according to the speed command value ω*r, in the overvoltage protection mode.

The current limiting unit 375 in the inverter controller 430 may set the flux current command value $i^*_d$ for driving the motor 230 to a predetermined first level and set the torque current command value $i^*_q$ for driving the motor 230 to 0 in the overvoltage protection mode when the detected DC terminal voltage Vdc is higher than the first predetermined value and power is supplied form the motor 230 to the DC terminals. In the overvoltage protection mode, the voltage command generator 340 may generate a flux voltage command value $v^*_d$ on the basis of the flux current command value $i^*_d$ only and output the flux voltage command value $v^*_d$.

The switching control signal output unit 360 may output the switching control signal Sic, generated on the basis of the flux voltage command value $v^*_d$, to the inverter 420. Since the motor 230 is driven on the basis of the flux current command value $i^*_d$ only in the overvoltage protection mode, as described above, the rotating speed of the motor 230 is decreased and thus power consumption of the motor 230 is reduced. Accordingly, power supplied to the DC terminals is decreased, and abrupt DC terminal voltage increase may be prevented.

The current limiting unit 375 in the inverter controller 430 may drive the motor 230 on the basis of the flux current command value $i^*_d$ from among the flux current command value $i^*_d$ and the torque current command value $i^*_q$ for driving the motor 230 in the overvoltage protection mode when the detected DC terminal voltage Vdc is higher than the first predetermined value, power is supplied from the motor 230 to the DC terminals, and the rotating direction of the motor 230 is reverse. Particularly, the current limiting unit 375 can determine that the rotating direction of the motor 230 is reverse when the speed $\hat{ω}_r$ calculated in the speed calculation unit 320 has a negative value.

In addition, the current limiting unit 375 may drive the motor 230 on the basis of the flux current command value $i^*_d$ from among the flux current command value $i^*_d$ and the torque current command value $i^*_q$ for driving the motor 230 in the overvoltage protection mode when the detected DC terminal voltage Vdc is higher than the first predetermined value, power is supplied from the motor 230 to the DC terminals, and the rotating direction of the motor 230 is reverse. According to the overvoltage protection mode, the inverter controller 430 decreases the speed of the motor 230.

The inverter controller 430 may control the motor 230 to operate in a normal operation mode when the detected DC terminal voltage Vdc is lower than a second predetermined value less than the first predetermined value and power is supplied from the DC terminals to the motor 230 after the overvoltage protection mode. The current limiting unit 375 in the inverter controller 430 may control the motor 230 to operate on the basis of the torque current command value $i^*_q$ in the normal operation mode when the detected DC terminal voltage Vdc is lower than the second predetermined value less than the first predetermined value and power is supplied from the DC terminals to the motor 230, after the overvoltage protection mode. Accordingly, the speed of the motor 230 may be increased.

When the motor 230 is an SMPMSM (Surface-Mounted Permanent-Magnet Synchronous Motor), the flux current command value $i^*_d$ may be set to 0. However, the present disclosure is not limited thereto and the flux current command value $i^*_d$ may have a predetermined value in the case of weak field control.

In the normal operation mode, the voltage command generator 340 may generate a torque voltage command value $v^*_q$ on the basis of the torque current command value $i^*_q$ and output the torque voltage command value $v^*_q$. The switching control signal output unit 360 may output the switching control signal Sic, generated on the basis of the torque voltage command value $v^*_q$, to the inverter 420.

It is feasible to immediately increase the speed of the motor 230 without abrupt motor speed decrease by driving the motor 230 in the normal operation mode. Particularly, it is feasible to reduce unnecessary power consumption due to excessive motor speed decrease by preventing abrupt DC terminal voltage increase while reducing the speed of the motor 230 and then increasing the motor speed after the overvoltage protection mode. As a result, it is feasible to rapidly return to the normal operation mode after the overvoltage protection mode.

The DC terminal voltage detector B included in the motor driver 220 detects the DC terminal voltage Vdc (S510). The detected DC terminal voltage Vdc is applied to the inverter controller 430. The output current detector E in the motor driver 220 detects the output current $i_o$ (S515). The detected output current $i_o$ is input to the inverter controller 430.

The inverter controller 430 in the motor driver 220 calculates power on the basis of the detected output current $i_o$ (S520). Particularly, the power calculation unit 365 in the inverter controller 430 calculates the power Pca. The inverter controller 430 in the motor driver 220 determines whether the detected DC terminal voltage Vdc is higher than the first predetermined value and whether power is supplied from the motor 230 to the DC terminals (S525). When the detected DC terminal voltage Vdc is higher than the first predetermined value and power is supplied from the motor 230 to the DC terminals, the inverter controller 430 in the motor driver 220 controls the motor 230 to operate in the overvoltage protection mode.

Specifically, the current limiting unit 375 of the inverter controller 430 in the motor driver 220 limits current command values (S535). For example, the current limiting unit 375 of the inverter controller 430 limits the current command values such that the motor 230 is driven on the basis of only the flux current command value $i^*_d$ from among the flux current command value $i^*_d$ and the torque current command value $i^*_q$.

Specifically, the current limiting unit 375 of the inverter controller 430 can set the flux current command value $i^*_d$ for driving the motor 230 to a first level and set the torque current command value $i^*_q$ for driving the motor 230 to 0. Accordingly, the inverter controller 430 in the motor driver 220 can control the motor 230 to consume less power by decreasing the speed thereof. The voltage applied to the DC terminals may be reduced, and the DC terminals may be stabilized.

The inverter controller 430 in the motor driver 220 determines whether the detected DC terminal voltage Vdc is lower than the second predetermined value less than the first predetermined value and whether power is supplied form the DC terminals to the motor 230 (S540). When the detected DC terminal voltage Vdc is lower than the second predetermined value less than the first predetermined value and power is supplied form the DC terminals to the motor 230, the inverter controller 430 in the motor driver 220 controls the motor 230 to operate in the normal operation mode (S555).

The inverter controller 430 in the motor driver 220 may control restriction on the flux current command value $i^*_d$ and the torque current command value $i^*_q$ to be cancelled. For example, the inverter controller 430 may control the motor 230 to operate on the basis of the torque current command value $i^*_q$ in the normal operation mode. Particularly, the inverter controller 430 generates a current command value, e.g., the torque current command value $i^*_q$, on the basis of the speed command value $w^*_r$, generates the torque voltage command value $v^*_q$ on the basis of the torque current command value $i^*_q$, generates the inverter switching control signal Sic on the basis of the torque voltage command value $v^*_q$ and outputs the inverter switching control signal Sic.

Accordingly, it is feasible to reduce unnecessary power consumption due to excessive decrease of the speed of the motor 230 by increasing the reduced motor speed after the overvoltage protection mode. It is feasible to rapidly return to the normal operation mode after the overvoltage protection mode.

Figure 5A:
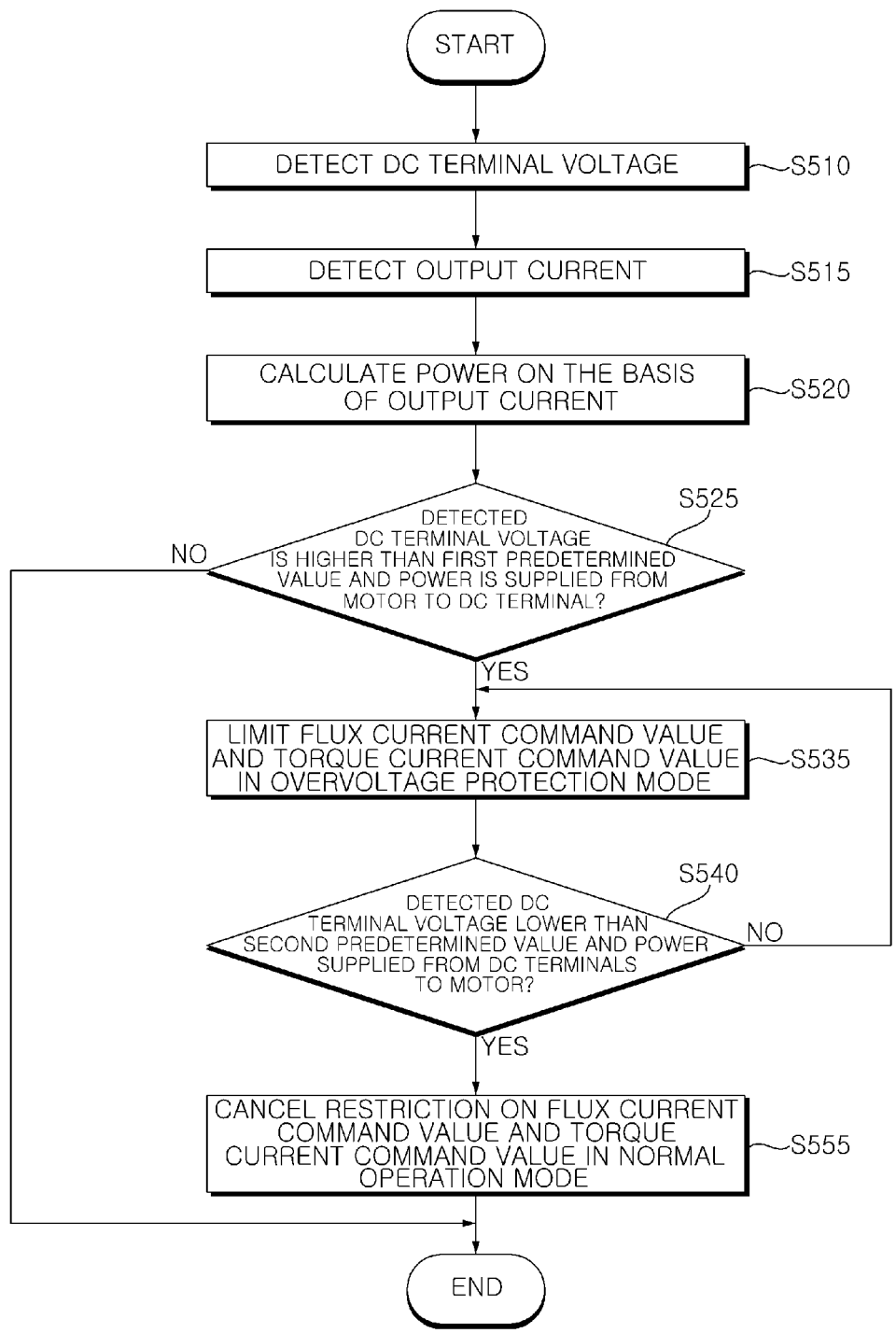
FIGS. 5A and 5B are flowcharts illustrating methods for operating a motor driving device according to embodiments of the present disclosure.
Figure 5B:
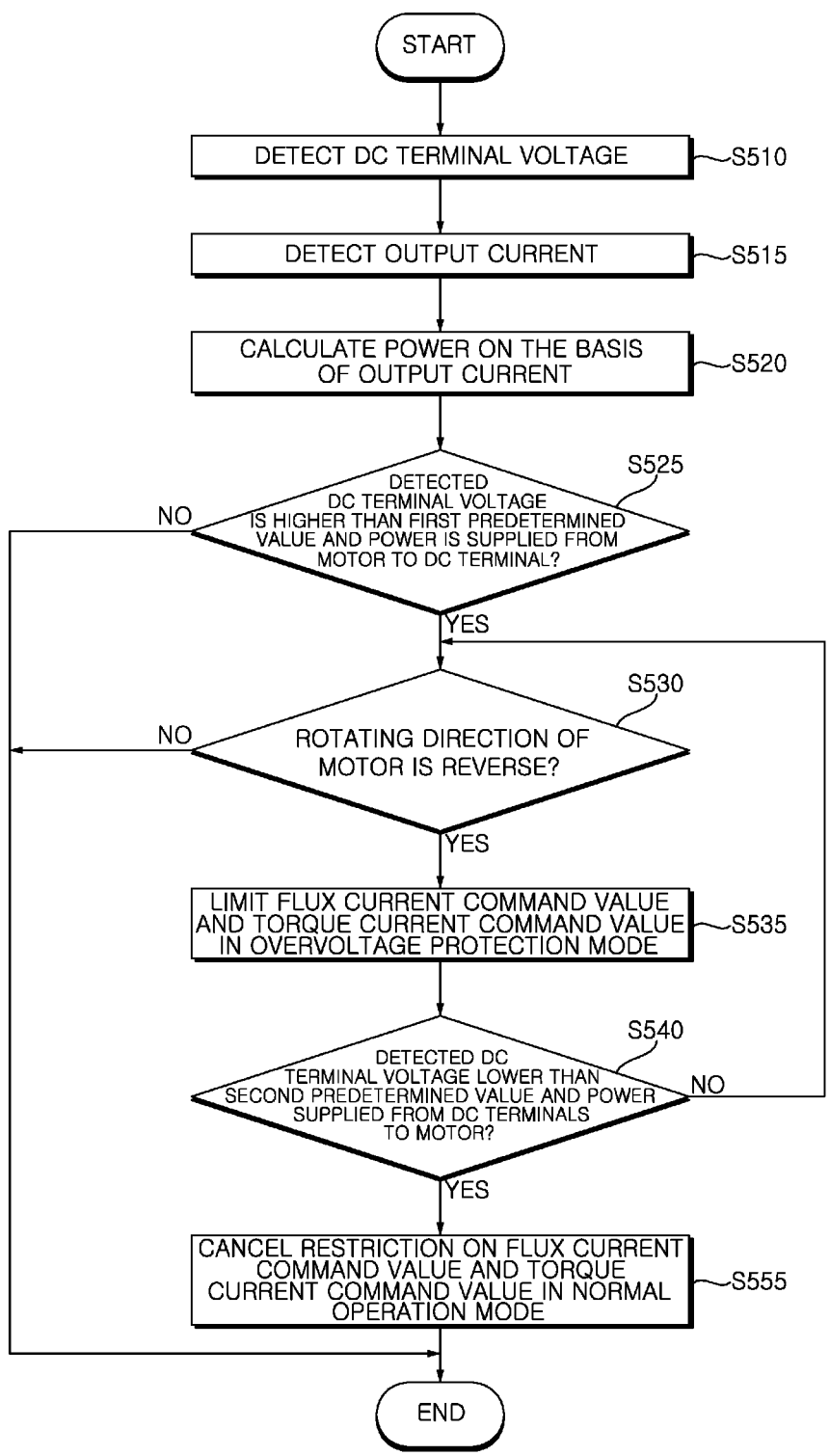

While the operation illustrated in FIG. 5B is similar to the operation shown in FIG. 5A, the operation shown in FIG. 5A differs from the operation shown in FIG. 5A in that the former further includes step S530. The following description is based on such difference.

The inverter controller 430 in the motor driver 220 may determine whether the detected DC terminal voltage Vdc is higher than the first predetermined value, whether power is supplied form the motor 230 to the DC terminals and whether the motor 230 reversely rotates in the overvoltage protection mode (S530). The speed calculation unit 320 in the inverter controller 430 may calculate the speed of the motor 230 on the basis of the output current. The current limiting unit 375 can determine that the motor 230 reversely rotates when the calculated motor speed has a negative value. Accordingly, the current limiting unit 375 may restrict the flux current command value $i^*_d$ and the torque current command value $i^*_q$.

In other words, when the detected DC terminal voltage Vdc is higher than the first predetermined value and power is supplied from the motor 230 to the DC terminals, the flux current command value $i^*_d$ for driving the motor 230 may be set to the first level and the torque current command value $i^*_q$ for driving the motor 230 may be set to 0. Accordingly, it is possible to prevent abrupt DC terminal voltage increase.

Figure 6A:
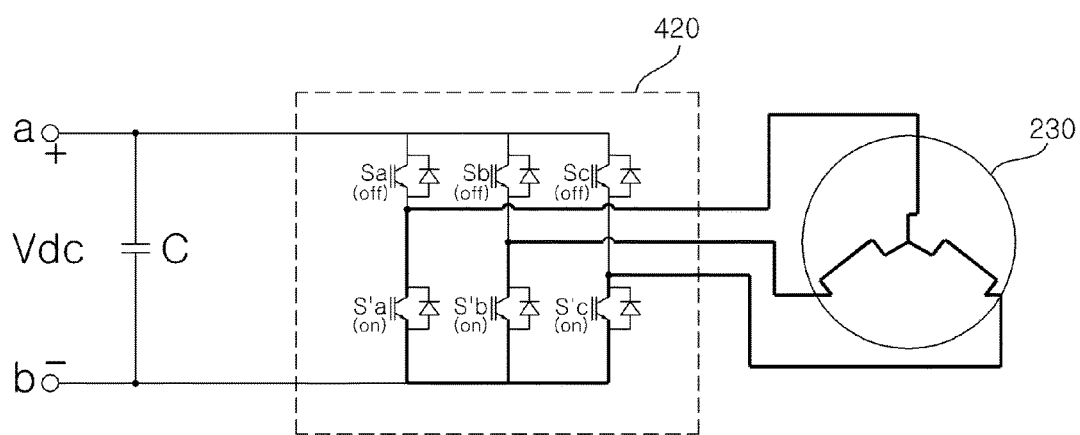
FIGS. 6A to 11B are diagrams for explaining the methods illustrated in FIGS. 5A and 5B.

FIG. 6A illustrates a method of switching off the upper switching elements Sa, Sb and Sc of the inverter 420 and switching on the lower switching elements S'a, S'b and S'c in order to stop the motor 230. The inverter 420 operates according to the switching control signal Sic of a zero vector to consume power according to current flow and the motor 230 is stopped after a predetermined time. This method can be referred to as dynamic braking.

Figure 6B:
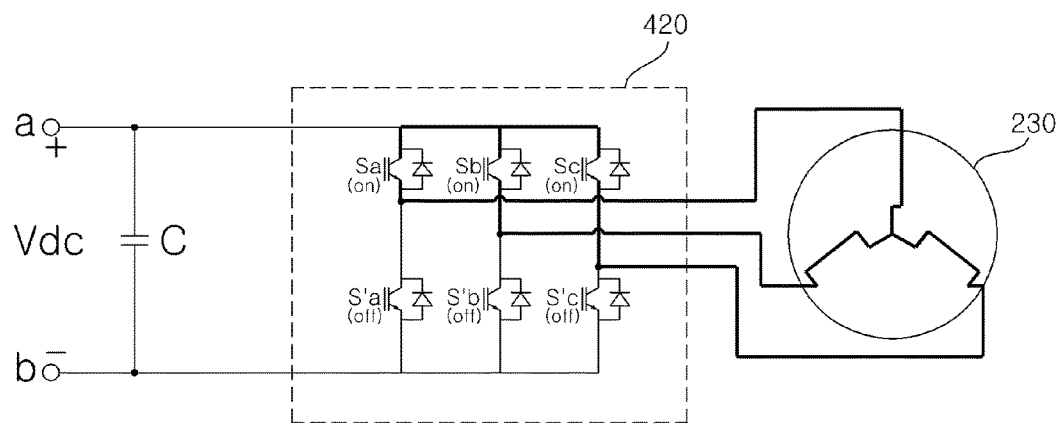

FIG. 6B illustrates a method of switching on the upper switching elements Sa, Sb and Sc of the inverter 420 and switching off the lower switching elements S'a, S'b and S'c in order to stop the motor 230. The inverter 420 operates according to the switching control signal Sic of the zero vector to consume power according to current flow and the motor 230 is stopped after a predetermined time.

Figure 6C:
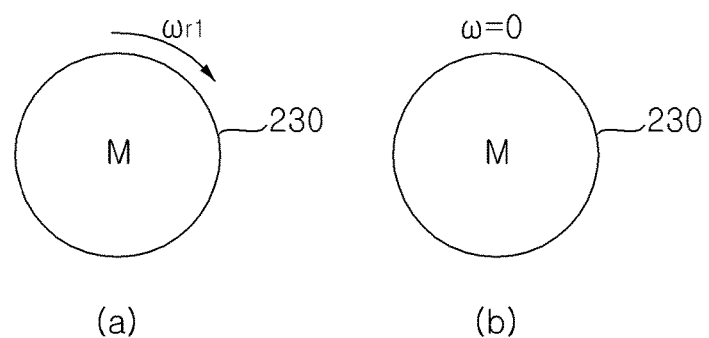

FIG. 6C illustrates operation of the motor 230 in which the motor 230 rotates clockwise at a predetermined speed ωr1 and then the motor 230 is stopped according to the switching control signal Sic of the zero vector shown in FIG. 6A or 6B.

Figure 6D:
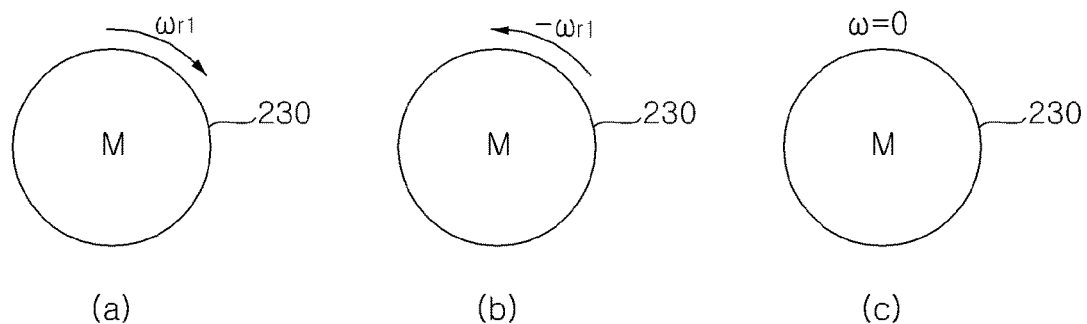

FIG. 6D illustrates operation of the motor 230 in which the motor 230 rotates clockwise at the predetermined speed ωr1, rotates counterclockwise at a predetermined speed −ωr1 and then the motor 230 is stopped according to the switching control signal Sic of the zero vector shown in FIG. 6A or 6B.

When the motor 230 is driven by the methods illustrated in FIGS. 6A and 6B, the motor 230 is abruptly stopped as shown in FIG. 6C or 6D to cause vibration and noise. For example, when the DC terminal voltage Vdc exceeds an allowable value during high-speed operation of the motor 230, if the motor 230 is driven by the methods of FIGS. 6A and 6B, the motor 230 is abruptly stopped, as shown in FIG. 6C or 6D, causing vibration and noise. To drive the motor 230 after the abrupt stop, additional power may be consumed.

Figure 7A:
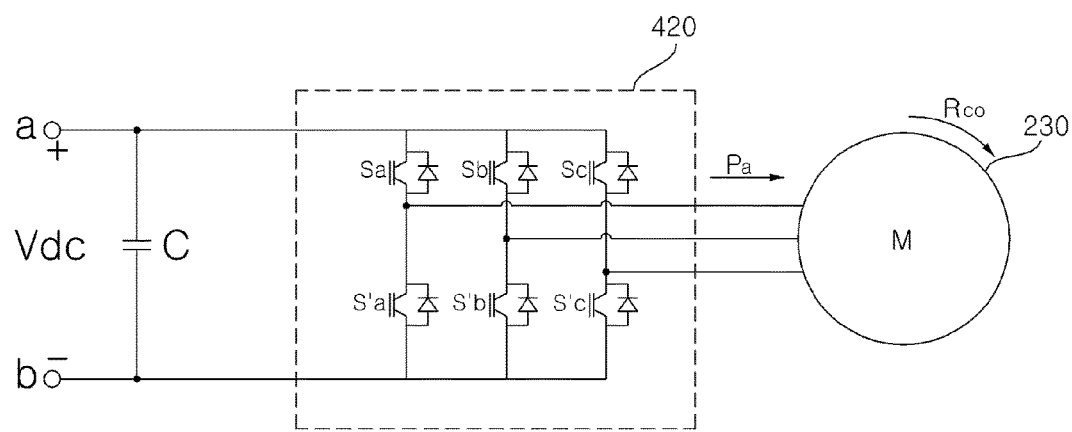
Figure 7B:
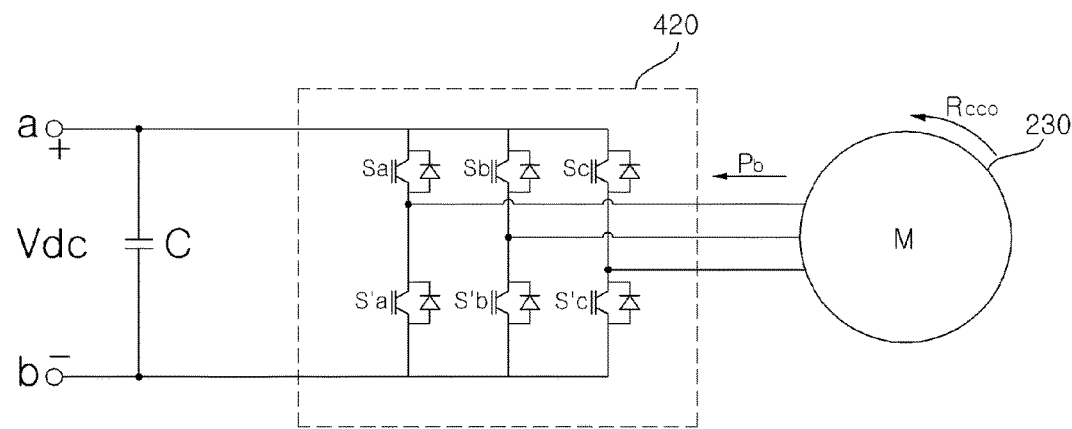

FIG. 7A illustrates a case in which the motor 230 normally operates and power Pa is supplied to the motor 230 from the inverter 420. The motor 230 may rotate clockwise Rco. FIG. 7B illustrates a case in which the motor 230 abnormally operates and the power Pa is supplied from the motor 230 to the inverter 420. In this case, the motor 230 can rotate counterclockwise Rcco.

In order to prevent excessive noise and vibration when the DC terminal voltage abruptly increases since the motor 230 abnormally operates, as shown in FIG. 7B, the present disclosure discloses a method for preventing the DC terminal voltage Vdc from abruptly increasing while reducing the speed of the motor 230. As described above, the inverter controller 430 may control the motor 230 to operate on the basis of the flux current command value $i^*_d$ from among the flux current command value $i^*_d$ and the torque current command value $i^*_q$ for driving the motor 230 in the overvoltage protection mode when the detected DC terminal voltage Vdc is higher than the first predetermined value and power is supplied from the motor 230 to the DC terminals.

In addition, the inverter controller 430 may control the motor 230 to operate on the basis of the flux current command value $i^*_d$ from among the flux current command value $i^*_d$ and the torque current command value $i^*_q$ for driving the motor 230 in the overvoltage protection mode when the detected DC terminal voltage Vdc is higher than the first predetermined value, power is supplied from the motor 230 to the DC terminals, and the motor 230 reversely rotates.

Figure 8:
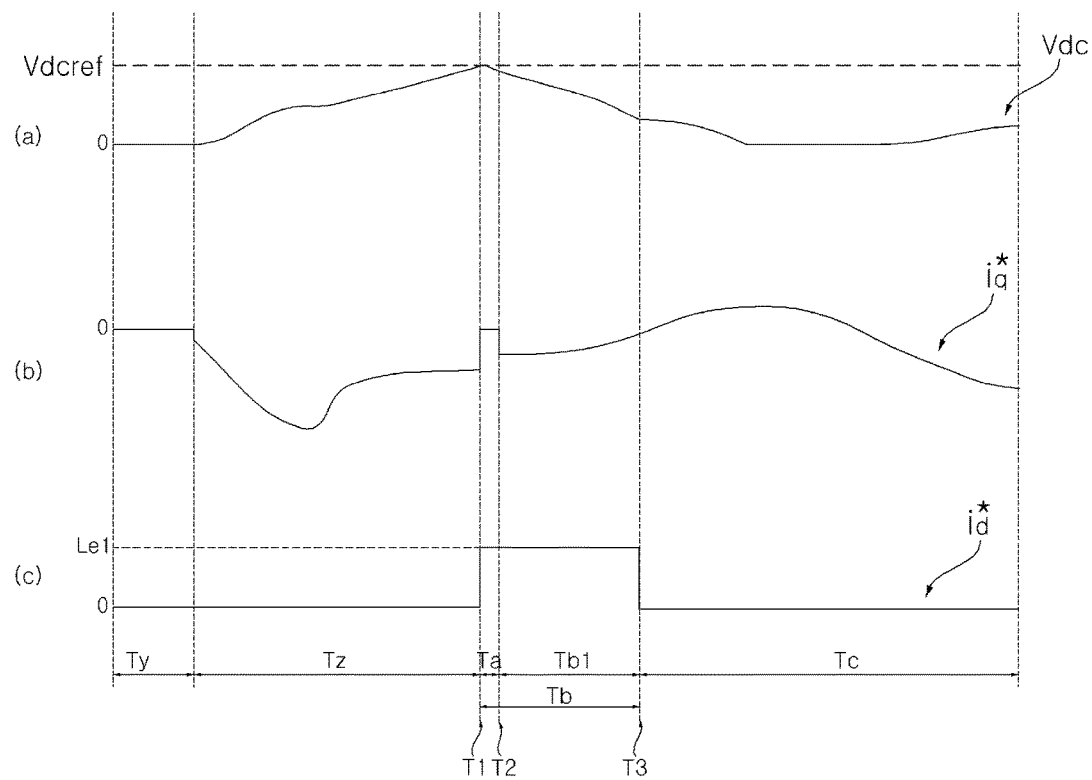

FIG. 8 is a waveform diagram showing the torque current command value $i^*_q$ and the flux current command value $i^*_d$ according to DC terminal voltage variation. An interval Ty indicates a period in which the motor 230 is stopped and an interval Tz indicates a period in which the motor 230 operates.

The inverter controller 430 may set the flux current command value $i^*_d$ to 0 and control the torque current command value $i^*_q$ to vary during the interval Tz prior to the overvoltage protection mode. Accordingly, the DC terminal voltage Vdc can increase during the interval Tz, as shown in FIG. 8.

When the DC terminal voltage Vdc reaches the first predetermined value vdcref at a time T1, the inverter controller 430 executes the overvoltage protection mode. The inverter controller 430 controls the overvoltage protection mode to be executed for an interval Tb. The first predetermined value Vdcref may be about 400V. Specifically, the inverter controller 430 limits the flux current command value $i^*_d$ and the torque current command value $i^*_q$ for the interval Tb.

FIG. 8 shows that the torque current command value $i^*_q$ is 0 for an interval Ta (between T1 and T2) included in the interval Tb. The flux current command value $i^*_d$ may be set to the first level Le1. At the time T2, the torque current command value $i^*_q$ may be changed to a non-zero value. The flux current command value $i^*_d$ may be kept at the first level Le1 from T2 to T3, that is, for an interval Tb1.

The inverter controller 430 determines whether to execute the overvoltage protection mode again on the basis of the detected DC terminal voltage after the overvoltage protection mode. The inverter controller 430 controls the normal operation mode to be executed when the detected DC terminal voltage Vdc is lower than the second predetermined value less than the first predetermined value and power is supplied from the DC terminals to the motor 230, after the overvoltage protection mode.

In FIG. 8, an interval Tc corresponds to a period in which the normal operation mode is executed. Accordingly, the flux current command value $i^*_d$ can be set to 0 and the torque current command value $i^*_q$ can be varied for the interval Tc.

Figure 9A:
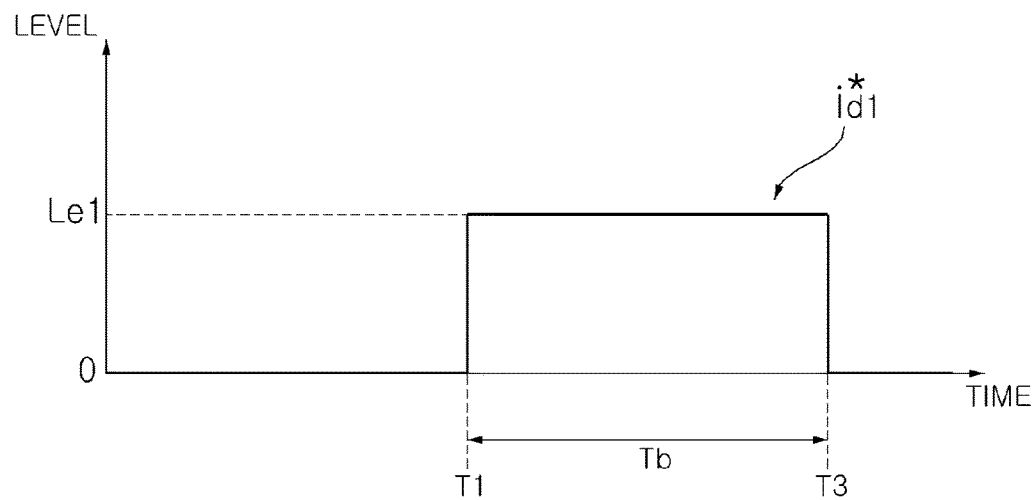

FIG. 9A shows a case in which a flux current command value $i^*_{d1}$ is set to 0 prior to the overvoltage protection mode and set to the first level Le1 for the interval Tb corresponding to the overvoltage protection mode period. The inverter controller 430 can set the flux current command value $i^*_{d1}$ to 0 prior to the overvoltage protection mode and set the flux current command value $i^*_{d1}$ to the first level Le1 during the interval Tb corresponding to the overvoltage protection mode period.

Figure 9B:
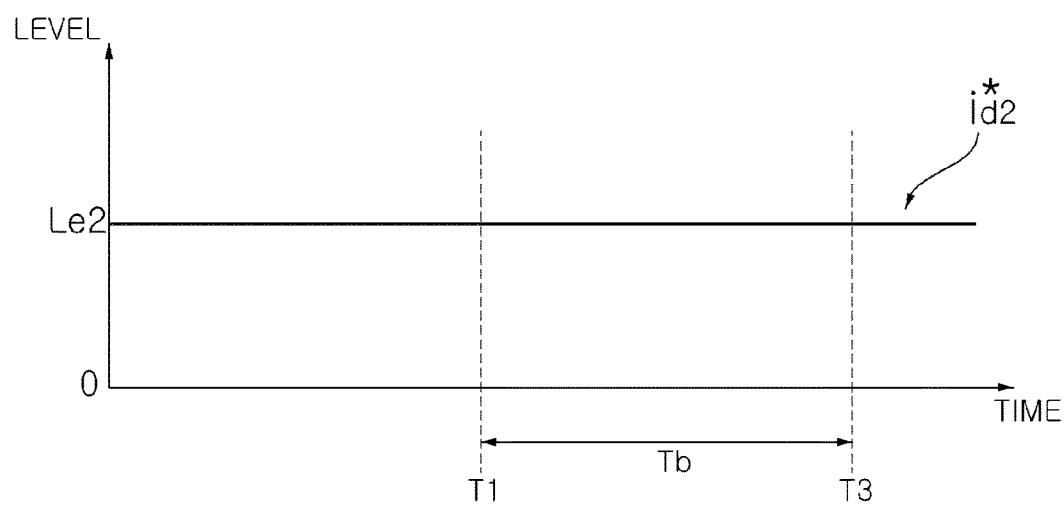

FIG. 9B shows a case in which a flux current command value $i^*_{d2}$ is set to a second level Le2 lower than the first level Le1 prior to the overvoltage protection mode and kept at the second level Le2 for the interval Tb corresponding to the overvoltage protection mode period. The inverter controller 430 may control the motor 230 to operate on the basis of the flux current command value $i^*_{d2}$ in addition to the torque current command value when weak field control is performed prior to the overvoltage protection mode. FIG. 9B shows that the flux current command value $i^*_{d2}$ is set to the second level Le2.

In this state, when the overvoltage protection mode is executed, the inverter controller 430 controls the flux current command value $i^*_{d2}$ to be maintained. A torque current command value $i^*_{q2}$ is set to 0. Accordingly, the inverter controller 430 may control the flux current command value $i^*_{d2}$ to be maintained when the overvoltage protection mode is executed during weak field control.

When the overvoltage protection mode is executed during weak field control, the inverter controller 430 may set the flux current command value $i^*_{d2}$ to a level lower than the level Le1 of the flux current command value $i^*_{d1}$, which is set when the overvoltage protection mode is executed while weak field control is not performed.

Figure 10A:
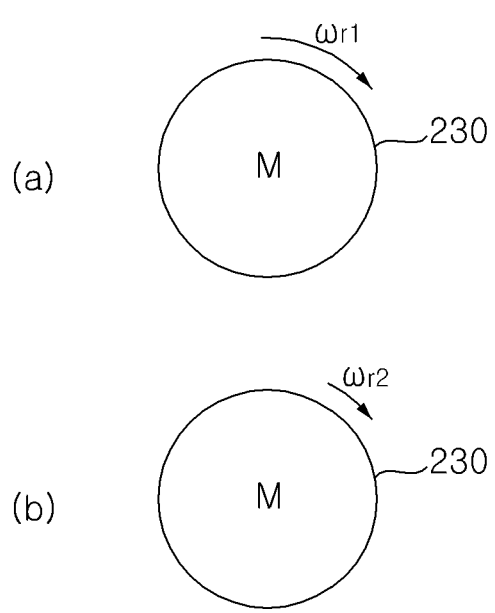
Figure 10B:
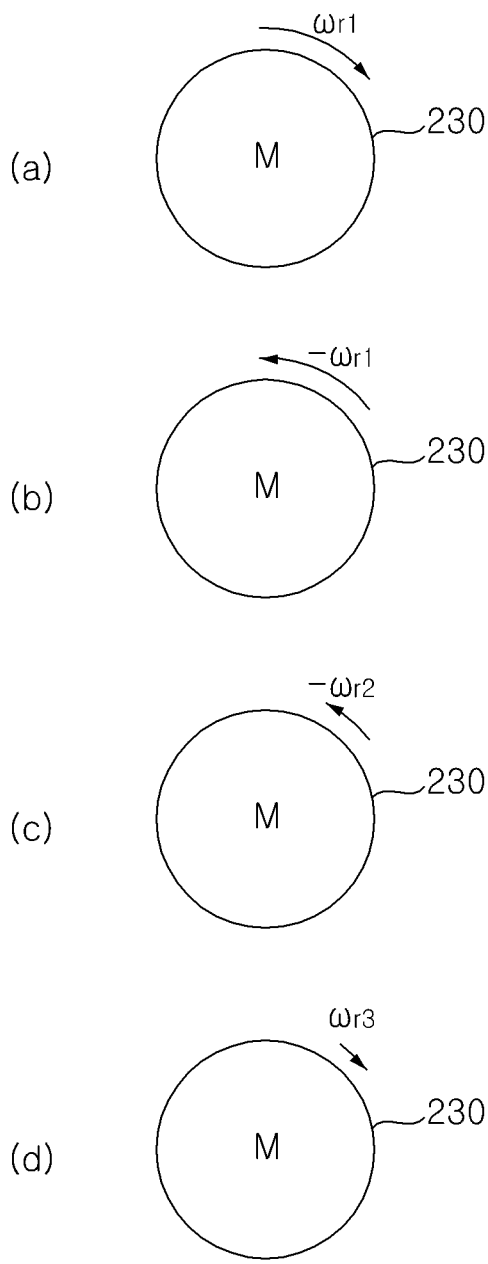

FIGS. 10A and 10B illustrate operations of the motor 230 in the overvoltage protection mode and the normal operation mode.

FIG. 10A shows operation of the motor 230 in the overvoltage protection mode when the motor 230 rotates at ωr1, as shown in FIG. 10A (a). In this case, the speed of the motor 230 decreases to ωr2, as shown in FIG. 10A (b). Subsequently, operation in the normal operation mode can be immediately performed. As described above, it is possible to prevent the DC terminal voltage from abruptly increasing without stopping the motor 230 by limiting the torque current command value $i^*_q$ to 0 and setting the flux current command value $i^*_d$ to the first level in the overvoltage protection mode. Accordingly, unnecessary power consumption can be reduced when the reduced motor speed is increased in the normal operation mode.

FIG. 10B shows operation of the motor 230 when the motor 230 rotates clockwise at ωr1, as shown in FIG. 10B (a), and then rotates counterclockwise at ωr1, as shown in FIG. 10B (b). The DC terminal voltage may abruptly increase due to instantaneous change between forward rotation and reverse rotation of the motor, and power may be supplied from the motor 230 to the DC terminals, as described above.

Accordingly, the inverter controller 430 controls the overvoltage protection mode to be executed in FIG. 10B (c) and (d). FIG. 10B (c) illustrates counterclockwise rotation of the motor 230 at −ωr2 and FIG. 10B (d) illustrates clockwise rotation of the motor 230 at ωr3. In this case, the speed of the motor 230 can gradually decrease, i.e., ωr1>ωr2>ωr3. After the overvoltage protection mode, the speed of the motor 230 can increase in the normal operation mode.

Figure 11A:
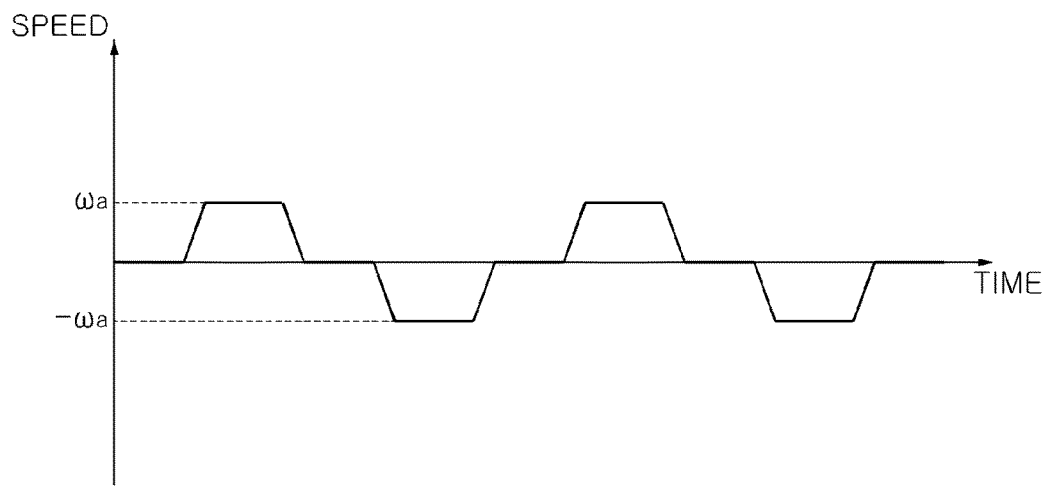

Referring to FIG. 11A, the motor 230 rotates at ωra and then rotates at −ωra. When forward rotation and reverse rotation of the motor 230 are repeated in this manner, the detected DC terminal voltage is higher than the first predetermined value and power is supplied from the motor 230 to the DC terminals. In this case, the inverter controller 430 may set the flux current command value $i^*_d$ for driving the motor 230 to the first level and set the torque current command value $i^*_q$ for driving the motor 230 to 0 in the overvoltage protection mode, as described above.

A case in which forward rotation and reverse rotation of the motor 230 are repeated, as shown in FIG. 11A, may correspond to operation of sensing the amount of clothing, spin-drying in the spin-drying cycle, and operation of untangling clothing in the washing cycle in the laundry treatment apparatus 100. Accordingly, the laundry treatment apparatus may set the flux current command value $i^*_d$ for driving the motor 230 to the first level and set the torque current command value $i^*_q$ for driving the motor 230 to 0 during operation of sensing the amount of clothing, spin-drying in the spin-drying cycle or operation of untangling clothing in the washing cycle, in which forward rotation and reverse rotation of the motor 230 are repeated.

Figure 11B:
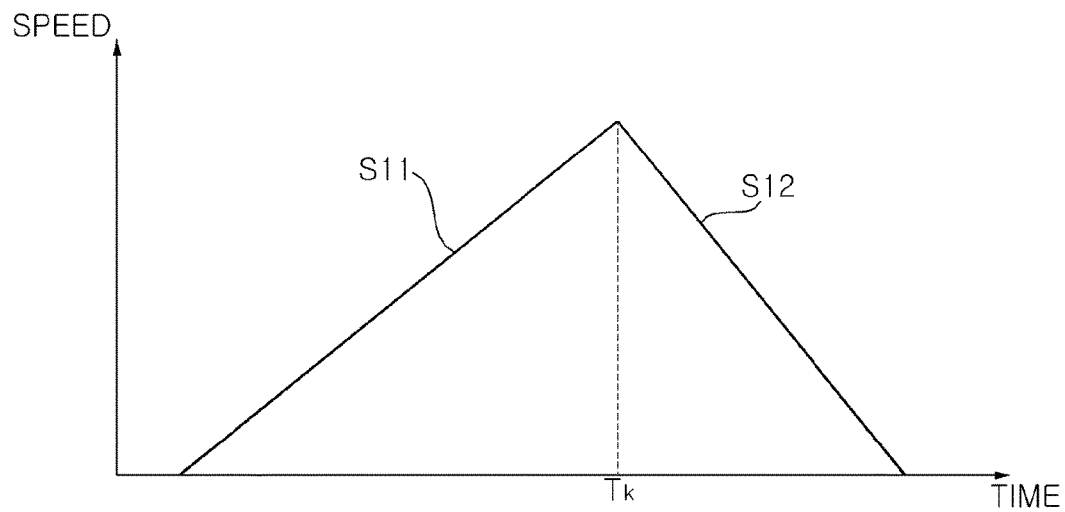

FIG. 11B illustrates a case in which the rotating speed of the motor 230 abruptly increases and then abruptly decreases and stops. The rotating speed of the motor 230 increases with a gradient S11 and then starts to decrease at Tk with a gradient S12.

When the rotating speed of the motor 230 abruptly increases and then decreases, the detected DC terminal voltage Vdc is higher than the first predetermined value and power is supplied from the motor 230 to the DC terminals. In this case, the inverter controller 430 may set the flux current command value $i^*_d$ for driving the motor 230 to the first level and set the torque current command value $i^*_q$ for driving the motor 230 to 0 in the overvoltage protection mode.

A case in which the rotating speed of the motor 230 abruptly increases and then decreases, as shown in FIG. 11B, may correspond to spin-drying in the spin-drying cycle of the laundry treatment apparatus 100, particularly, finishing of spin-drying. Accordingly, the laundry treatment apparatus may set the flux current command value $i^*_d$ for driving the motor 230 to the first level and set the torque current command value $i^*_q$ for driving the motor 230 to 0 during spin-drying in the spin-drying cycle, particularly, when spin-drying is finished.

The motor driving device and the laundry treatment apparatus according to the present disclosure are not limited to the aforementioned embodiments and all or some embodiments may be selectively combined such that the embodiments can be modified in various manners.

The motor operating methods or laundry treatment apparatus operating methods according to the present disclosure may be implemented as code that can be written to a processor-readable recording medium included in the motor driving device or the laundry treatment apparatus and can thus be read by a processor. The processor-readable recording medium may be any type of recording device in which data can be stored in a processor-readable manner.

A motor driving device may prevent a DC terminal voltage from abruptly increasing and a laundry treatment apparatus including the same.

A motor driving device may prevent a DC terminal voltage from sharply increasing without abruptly decreasing motor speed and a laundry treatment apparatus including the same.

A motor driving device may include: an inverter configured to convert a DC voltage of DC terminals into an AC voltage according to switching operation and to output the AC voltage to a motor; a DC terminal voltage detector configured to detect the voltage of the DC terminals; an output current detector configured to detect an output current flowing through the motor; and a controller configured to control the inverter on the basis of the detected output current, wherein the controller controls the motor to operate on the basis of a flux current command value from among the flux current command value and a torque current command value for driving the motor in an overvoltage protection mode when the detected DC terminal voltage is higher than a first predetermined value and power is supplied from the motor to the DC terminals.

A motor driving device may include: an inverter configured to convert a DC voltage of DC terminals into an AC voltage according to switching operation and to output the AC voltage to a motor; a DC terminal voltage detector configured to detect the voltage of the DC terminals; an output current detector configured to detect an output current flowing through the motor; and a controller configured to control the inverter on the basis of the detected output current, wherein the controller controls the speed of the motor to decrease in an overvoltage protection mode when the detected DC terminal voltage is higher than a first predetermined value and power is supplied from the motor to the DC terminals, wherein the controller controls the speed of the motor to increase in a normal operation mode when the detected DC terminal voltage is lower than a second predetermined value less than the first predetermined value and power is supplied from the DC terminals to the motor, after the overvoltage protection mode.

A laundry treatment apparatus, may include: a washing tub; a motor configured to rotate the washing tub; and a driver configured to drive the motor, wherein the driver comprises: an inverter configured to convert a DC voltage of DC terminals into an AC voltage according to switching operation and to output the AC voltage to a motor; a DC terminal voltage detector configured to detect the voltage of the DC terminals; an output current detector configured to detect an output current flowing through the motor; and a controller configured to control the inverter on the basis of the detected output current, wherein the controller controls the motor to operate on the basis of a flux current command value from among the flux current command value and a torque current command value for driving the motor in an overvoltage protection mode when the detected DC terminal voltage is higher than a first predetermined value and power is supplied from the motor to the DC terminals.

The motor driving device and the laundry treatment apparatus including the same may prevent a DC terminal voltage from sharply increasing by driving a motor on the basis of a flux current command value between the flux current command value and a torque current command value for driving the motor in an overvoltage protection mode when the DC terminal voltage is higher than a first predetermined value and power is supplied from the motor to the DC terminal.

Since the motor is driven on the basis of the flux current command value only in the overvoltage protection mode, the motor speed may be decreased, and power consumption of the motor may be reduced. Accordingly, power supplied to the DC terminal is decreased. That is, abrupt DC terminal voltage increase can be prevented.

In addition, the motor driving device and the laundry treatment apparatus including the same may prevent a DC terminal voltage from sharply increasing without abruptly decreasing the motor speed by driving the motor on the basis of the torque current command value in a normal operation mode when the DC terminal voltage is lower than a second threshold value less than the first predetermined value and power is supplied to the DC terminal, after the overvoltage protection mode.

The motor driving device and the laundry treatment apparatus including the same may decrease unnecessary power consumption due to excessive motor speed reduction by preventing abrupt DC terminal voltage increase while reducing the motor speed in the overvoltage protection mode and, after the overvoltage protection mode, increasing the motor speed.

The motor driving device and the laundry treatment apparatus including the same may rapidly return to the normal operation mode after the overvoltage protection mode.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving device, comprising:
an inverter configured to convert a DC voltage of DC terminals into an AC voltage according to a switching operation and to output AC voltage for a motor;
a DC terminal voltage detector configured to detect the voltage of the DC terminals;
an output current detector configured to detect an output current flowing through the motor; and
a controller configured to control the inverter based on the detected output current,
wherein the controller is configured to control the motor to operate based on a flux current command value from among the flux current command value and a torque current command value for driving the motor in an overvoltage protection mode when rotation direction of the motor is switched from forward rotation to reverse rotation, the detected DC terminal voltage is higher than a first predetermined value, and power is supplied from the motor to the DC terminals,
wherein the controller is configured to control a speed of the motor to decrease in the overvoltage protection mode,
wherein the controller is configured to reversely rotate the motor at a first speed, to reversely rotate at a second speed less than the first speed, and then to forwardly rotate the motor at a third speed less than the second speed in the overvoltage protection mode.

2. The motor driving device of claim 1, wherein the controller is configured to set the flux current command value for driving the motor to a first level and to set the torque current command value for driving the motor to zero, when the detected DC terminal voltage is higher than the first predetermined value and power is supplied from the motor to the DC terminals.

3. The motor driving device of claim 1, wherein the controller is configured to control the motor to operate based on the torque current command value in a normal operation mode, after the overvoltage protection mode, when the detected DC terminal voltage is lower than a second predetermined value, which is less than the first predetermined value, and power is supplied from the DC terminals to the motor.

4. The motor driving device of claim 1, wherein the controller is configured to control the speed of the motor to increase in a normal operation mode when the detected DC terminal voltage is lower than a second predetermined value, which is less than the first predetermined value, and power is supplied from the DC terminals to the motor after the overvoltage protection mode.

5. The motor driving device of claim 1, wherein the controller is configured to set the torque current command value for driving the motor to zero for a first period in the overvoltage protection mode and to set the flux current command value for driving the motor to a first level for a second period including the first period.

6. The motor driving device of claim 1, wherein when the flux current command value for driving the motor is set to zero prior to the overvoltage protection mode, the controller is configured to set the flux current command value for driving the motor to a first level corresponding to a positive value in the overvoltage protection mode.

7. The motor driving device of claim 1, wherein when the flux current command value for driving the motor is set to a level having a positive value prior to the overvoltage protection mode, the controller is configured to set the flux current command value for driving the motor to the level corresponding to a positive value in the overvoltage protection mode.

8. The motor driving device of claim 1, wherein when the overvoltage protection mode is executed during a weak field control, the controller is configured to maintain the flux current command value for driving the motor and to set the torque current command value for driving the motor to zero.

9. The motor driving device of claim 1, wherein the controller includes:
a power calculation module configured to calculate power based on the detected output current; and
a current limiter configured to limit the flux current command value and the torque current command value for driving the motor to predetermined levels.

10. The motor driving device of claim 9, wherein the controller further includes:
a voltage command generator configured to calculate a voltage command value based on the flux current command value and the torque current command value outputted from the current limiter, in the overvoltage protection mode; and
a switching control signal output module configured to output a switching control signal for driving the inverter based on the voltage command value.

11. The motor driving device of claim 10, wherein the controller further includes a current command generator configured to generate a current command value according to a speed command value in a normal operation mode after the overvoltage protection mode, and
wherein the voltage command generator generates the voltage command value based on the current command value from the current command generator, and the switching control signal output module outputs the switching control signal for driving the inverter based on the voltage command value.

12. A motor driving device, comprising:
an inverter configured to convert a DC voltage of DC terminals into an AC voltage according to a switching operation and to output AC voltage for a motor;
a DC terminal voltage detector configured to detect the voltage of the DC terminals;
an output current detector configured to detect an output current flowing through the motor; and
a controller configured to control the inverter based on the detected output current,
wherein the controller is configured to control a speed of the motor to decrease in an overvoltage protection mode when rotation direction of the motor is switched from forward rotation to reverse rotation, the detected DC terminal voltage is higher than a first predetermined value, and power is supplied from the motor to the DC terminals,
wherein the controller is configured to control the speed of the motor to increase in a normal operation mode, after the overvoltage protection mode, when the detected DC terminal voltage is lower than a second predetermined value, which is less than the first predetermined value, and power is supplied from the DC terminals to the motor, and
wherein the controller is configured to reversely rotate the motor at a first speed, to reversely rotate at a second speed less than the first speed, and then to forwardly rotate the motor at a third speed less than the second speed in the overvoltage protection mode.

13. The motor driving device of claim 12, wherein the controller is configured to control the motor not to stop between the overvoltage protection mode and the normal operation mode.

14. A laundry treatment apparatus, comprising:
a washing tub;
a motor configured to rotate the washing tub; and
a driver configured to drive the motor,
wherein the driver includes:
an inverter configured to convert a DC voltage of DC terminals into an AC voltage according to a switching operation and to output the AC voltage for the motor;
a DC terminal voltage detector configured to detect the voltage of the DC terminals;
an output current detector configured to detect an output current flowing through the motor; and
a controller configured to control the inverter based on the detected output current,
wherein the controller is configured to control the motor to operate based on a flux current command value from among the flux current command value and a torque current command value for driving the motor in an overvoltage protection mode when rotation direction of the motor is switched from forward rotation to reverse rotation, the detected DC terminal voltage is higher than a first predetermined value, and power is supplied from the motor to the DC terminals,
wherein the controller is configured to control a speed of the motor to decrease in the overvoltage protection mode,
wherein the controller is configured to reversely rotate the motor at a first speed, to reversely rotate at a second speed less than the first speed, and then to forwardly rotate the motor at a third speed less than the second speed in the overvoltage protection mode.

15. The laundry treatment apparatus of claim 14, wherein the controller is configured to control the motor to operate based on the torque current command value in a normal operation mode after the overvoltage protection mode when the detected DC terminal voltage is lower than a second predetermined value, which is less than the first predetermined value, and power is supplied from the DC terminals to the motor.

16. The laundry treatment apparatus of claim 14, wherein the controller is configured to control the speed of the motor to increase in a normal operation mode, after the overvoltage protection mode, when the detected DC terminal voltage is lower than a second predetermined value, which is less than the first predetermined value, and power is supplied from the DC terminals to the motor.

17. The laundry treatment apparatus of claim 14, wherein the controller is configured to set the torque current command value for driving the motor to zero for a first period in the overvoltage protection mode and to set the flux current command value for driving the motor to a first level for a second period including the first period.

18. The laundry treatment apparatus of claim 14, wherein, when the flux current command value for driving the motor is set to zero prior to the overvoltage protection mode, the controller is configured to set the flux current command value for driving the motor to a first level corresponding to a positive value in the overvoltage protection mode.

19. The laundry treatment apparatus of claim 14, wherein when the flux current command value for driving the motor is set to a level having a positive value prior to the overvoltage protection mode, the controller is configured to set the flux current command value for driving the motor to the level corresponding to a positive value in the overvoltage protection mode.

* * * * *